April 18, 1933.  L. GRANGES  1,903,966
VEHICLE SUSPENSION DEVICE
Filed Aug. 4, 1930   4 Sheets-Sheet 3
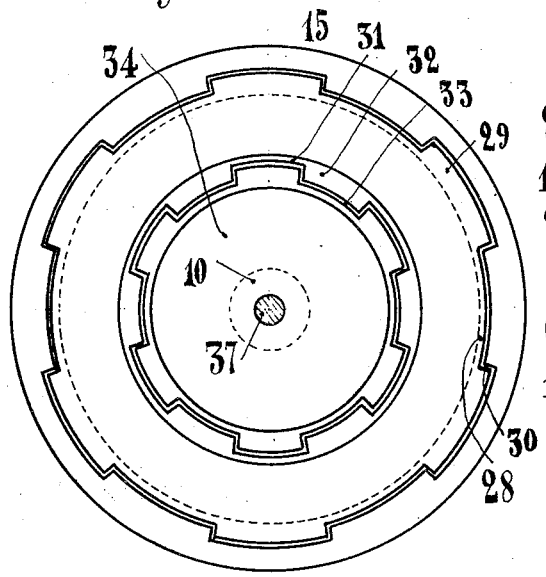
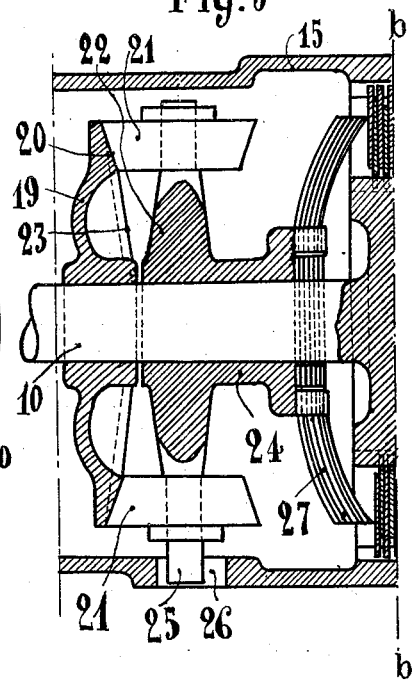
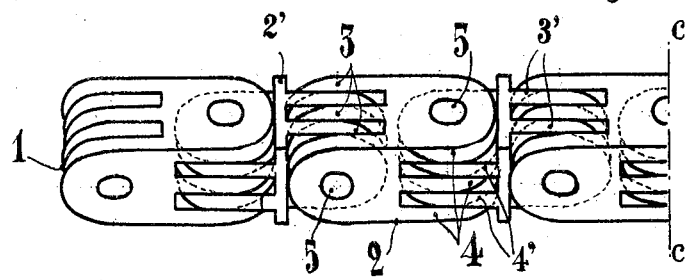
INVENTOR:
Louis Granges
BY
ATTORNEY April 18, 1933.  L. GRANGES  1,903,966
VEHICLE SUSPENSION DEVICE
Filed Aug. 4, 1930  4 Sheets-Sheet 4
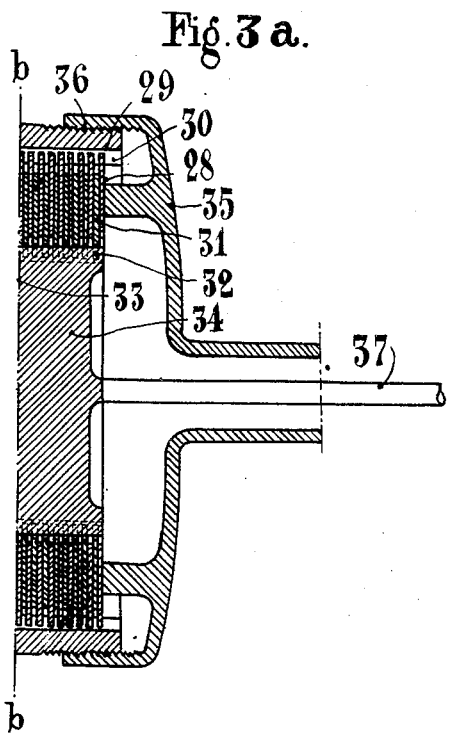
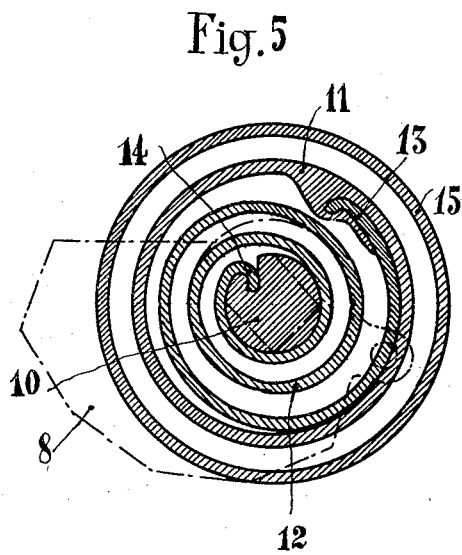
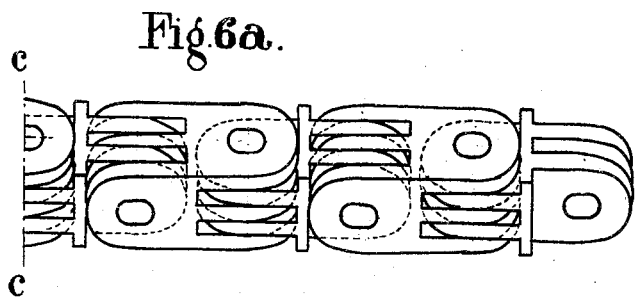
INVENTOR:
Louis Granges
BY
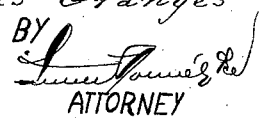
ATTORNEY Patented Apr. 18, 1933

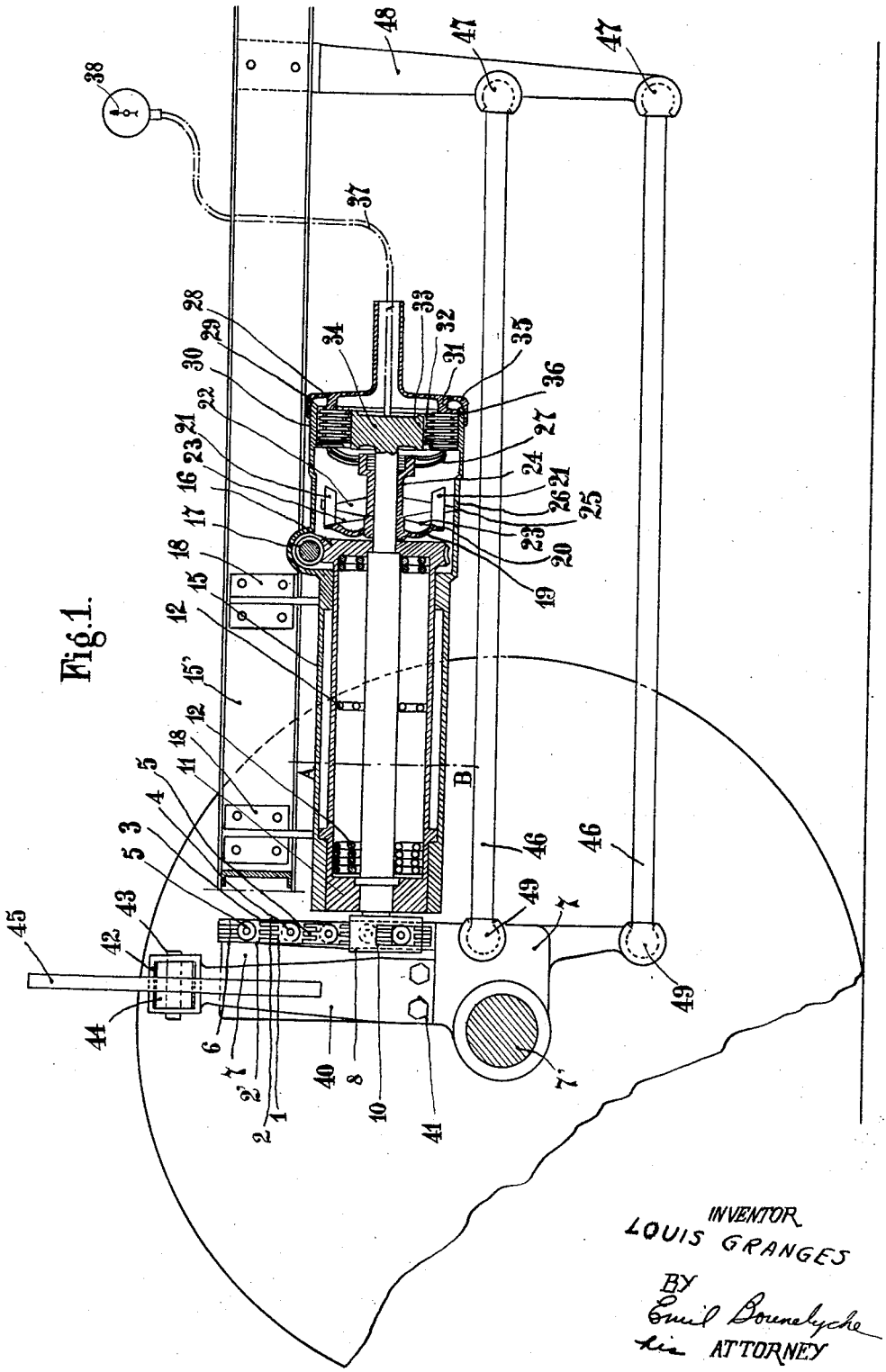

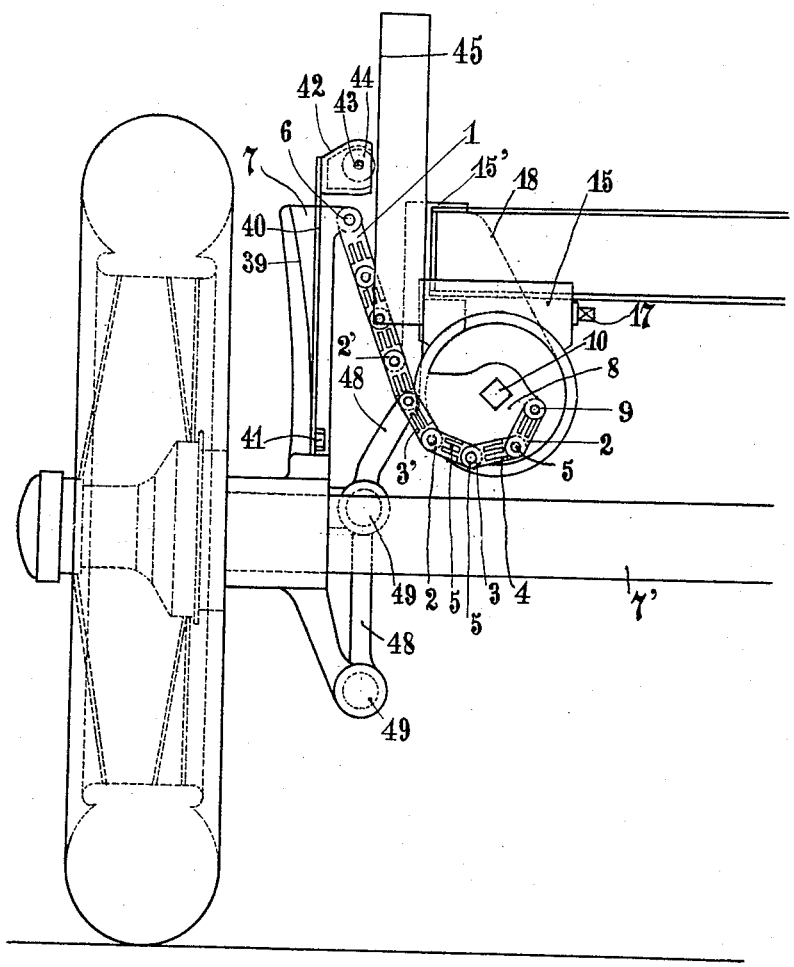

1,903,966

UNITED STATES PATENT OFFICE

LOUIS GRANGES, OF PARIS, FRANCE

VEHICLE SUSPENSION DEVICE

Application filed August 4, 1930, Serial No. 473,078, and in France May 27, 1930.

This invention has for its object a device adapted to provide for the elastic suspension of a vehicle chassis on the axles thereof.

In order that the invention may more easily be understood, it will now be further described with the aid of the accompanying drawings wherein:—

Figure 1 is a side elevational view partly in section of the whole device.

Figure 2 is an end view of the whole device.

Figures 3 and 3a taken together show a longitudinal cross section of the dampening device for the vertical oscillations of the chassis.

Figure 4 is an end view of the said dampening device with removed cover.

Figure 5 is a cross sectional view taken on line A—B in Fig. 1, the cam profile being shown in dot-and-dash lines.

Figures 6 and 6a taken together show a perspective view of the chain providing the suspending end.

A connecting member consisting e. g. of a chain 1 is secured at one end thereof by means of a pin 6 to a bracket 7 carried on the axle 7'. The chain 1 is made up of elements 2 and 2' formed with jaws 3, 4 and 3', 4' respectively, arranged at right angles to each other, the said elements being linked to one another by pins 5 which, similarly to jaws 3 and 4, are arranged at right angles to one another. The chain is run over a cam 8 or other suitable device having a variable working radius to which it is secured by means of a pin 9. The cam 8 is keyed on the shaft 10 mounted for free rotation in the casing 11.

Spiral springs 12 clamped at one end thereof in slots 13 in the casing 11 are secured at their other ends in slots 14 cut in the shaft 10.

The casing 11 is adapted to be rotated within a housing 15 by means e. g. of a worm wheel 16 rigid with the casing 11 and a worm spindle 17 rotatably mounted in the housing 15. The said worm spindle may be driven by means of a remote control gear not shown in the drawing. The housing 15 is secured to the chassis 15' by means of brackets 18.

The shaft 10 has secured on it a disc 19 formed with a circular track 20 engaged by a pair of rollers 21 loosely mounted on arm 22; the track 20 is formed with inclined faces 23.

The arm 22 rigid with a sleeve 24 is mounted for free sliding motion on the shaft 10 and is constrained from rotation by its extremity 25 sliding in a slot 26.

Arranged at the end of the sleeve 24 are a plurality of springs 27 adapted to exert a yielding thrust upon the discs 28. The said discs are formed with projections 29 guided in slots 30 in the housing 15. Interposed between the said discs 28 are discs 31 formed with projections 32 guided in slots 33 in a drum 34 rigid with the shaft 10.

A cover 35 is adapted to press upon the last disc 28 as a result e. g. of its thread engagement with the housing 15.

A flexible cable 37 rigid with the shaft 10 transmits the angular position of the cam 8 to an indicator hand 38.

The bracket 7 is formed with a curved bearing face 39 to be progressively engaged by a spring 40 secured to the bracket 7 at 41, as the said spring becomes deflected.

Secured at the free end of the springs 40 is a case 42 carrying a pin 43 on which there is loosely mounted a roller 44 guided on a track 45 rigid with the chassis 15'.

Links 46 providing a parallelogram by means on one hand of universal joints 47 rigid with the chassis 15' through the bracket 48 and on the other hand of fulcrums 49 rigid with the bracket 7 ensure the correct running of the roller 44 on the track 45 and at the same time hold the axle 7', same being secured to the bracket 7.

It will be understood from the above description that if the worm spindle 17 be rotated, the casing 11 will be driven by the worm wheel 16 and will in turn drive the ends of the springs 12 by means of the slot 13. This movement results in a torque being progressively applied by the springs 12 upon the shaft 10 through the slot 14. A corresponding stress is thereby exerted on the chain 1 by the cam 8 rigid with the shaft 10.

When the tangential stress set up on the cam 8 by the stress of the springs 12 is greater than the weight of the chassis 15', the latter is lifted by the rotation of the cam 8 on which the chain 1 is run. In this movement the chassis 15' becomes hung by the chain 1 to the bracket 7 and, thereby, to the axles 7'.

The chassis 15' thus hung to the axle 7' might move in all directions as a result of the flexibility of the chains 1. The chassis 15' is yieldingly maintained transversally by the rollers 44 which are operative in all the vertical positions of the chassis 15' by running on the tracks 45.

When the axles assume a tilted position, that is, when the chassis is inclined relatively to the axle, the horizontal distance between the tracks 45 on either side of the chassis 15' for one and the same axle is increased, which drives the rollers 44 further aside, a motion which is taken up by a flexion of the springs 40.

The bearing face 39 provides for a reaction of increasing magnitude of the spring 40 as the latter is progressively pressed against the said curved bearing face 39 as a result of an occasional transversal displacement of the chassis 15', the overhang of the spring 40 thus being progressively reduced.

The horizontal component set up by the load on the chain 1 is taken care of by the reaction of the spring 40 upon the track 45, whereby the bending stresses on the bracket 7 are reduced to a minimum.

The correct running of the rollers 44 on tracks 45 is ensured by the bracket 7 held by the parallelogram formed by the links 46.

It will be appreciated that as the wheels conform themselves to unevennesses in or on the road, the axle 7' in its vertical displacements will act upon the springs 12 through the suspension end 1 and the cam 8, and that the chassis 15' will be influenced vertically by the movements of the axle 7' only as measured by the ratio of the sum of the moments set up by the winding or unwinding of the suspension end 1 upon or from the cam 8 to the sum of the corresponding resistant moments of the yielding reaction member which, in the present instance, consists in the springs 12; the said ratio may be equal to 1/1 inasmuch as for any given elastic energy such a curvature may be found out for the cam 8 that balance will be established between the effort on the suspension end 1 and the reaction of the springs 12 at every point of tangency of the suspension end 1 on the curve of the cam 8.

From the foregoing it will be appreciated that with a cam 8 of suitable shape the desired flexibility of suspension may be obtained in its fullest extent.

In order that the vertical oscillations of the chassis 15' may be reduced both in time and space, a braking action is exerted upon the rotational movements of the cam 8; such braking action is obtained by frictional engagement between the discs 28 and the discs 31. Effectively, the discs 31 are driven into the movement of the shaft 10 by the slots 33 while the discs 28 are constrained from rotation by the slots 30 in the housing 15.

It is important for a satisfactory operation that in the intermediate position of the cam the braking effect should be minimum, as such braking effect must increase in intensity to reach its maximum when the displacement of the axle 7' on either side of the said intermediate position is at its limit.

Such result is attained as a result of the particular shape given to the circular track 20 which is formed with inclined faces 23 whereby the rollers 21 on the arm 22 are caused to move longitudinally, thus exerting a progressive pressure on the discs 28 and 31 through the intermedium of the springs 27 and the sleeve 24.

It is a known fact that the braking of the vertical oscillations of the chassis must have a greater or less effectiveness depending on the conditions of the road and the speed of the vehicle; such result is obtained on account of the greater or less pressure which the cover 35 may be caused to exert by more or less tightening the same on the housing 15; said cover 35 may be controlled from a remote position by known means.

The position of the cam 8 is influenced when the load on the vehicle is increased or decreased; in order that the said cam may be brought back to its intermediate position, the worm spindle 17 has to be operated to suitably tighten or loosen the springs 12.

The said worm spindle 17 may be operated from a remote position with due regard to the position of the hand 38 which indicates that of the cam 8.

It is to be understood that the embodiment described hereinbefore is by no ways of limitative character and lends itself to all desirable constructional modifications without departing from the scope of the invention.

I claim:

1. A suspension device for a vehicle having a chassis supported on a plurality of axles, comprising flexible connecting means between the chassis and the axles, a yielding power means, a rotatable cam in contact with the flexible means, the cam being contoured to be affected by the flexible means and in turn to affect the yielding power means, and means for controlling the intensity of the initial reaction of the yielding power means from a remote position so that irrespective of the magnitude of the load on the chassis the cam may assume a suitable intermediate position for every possible load condition, the said intermediate position of the cam permitting the elastic reactions to remain substantially proportional to the applied load.

2. A device as claimed in claim 1, wherein the rotary device in the rotational movement thereof is adapted to drive a plurality of discs interposed between a plurality of stationary discs, the discs during the rotation of the rotary device being all pressed in variable frictional contact with one another by inclined faces provided on a circular track rigid with the rotary device-carrying shaft; the said rotary device through interposed rollers and springs exerting a variable yielding pressure on the discs; means being provided whereby the pressure on the discs to be initially adjusted, the said means consisting in a movable abutment arranged for remote control with a view variably to intensify the braking effect resulting from the friction on the discs so as to adapt the said braking effect to given road and vehicle speed conditions.

3. A device as claimed in claim 1 wherein the flexible means consists of a chain adapted for flexion in all directions and each element of which consists of two sets of jaws rigid with and coaxially arranged to each other, the said elements being linked to one another by means of pins connecting the interfitting jaws of every pair of successive elements, the said pins, similarly to the related jaws, being arranged successively at right angles to one another.

4. A device as claimed in claim 1 wherein guiding means are provided to yieldingly keep the chassis in position with respect to the axle, said means consisting in a pair of tracks rigid with the chassis and rollers guided on the said tracks onto which they are yieldingly pressed by springs secured to brackets attached to the axle, the bearing faces engaged by the said springs being so shaped that as the spring is occasionally deflected its overhang decreases as a result of a winding action of the same over its bearing, whereby the reaction capacity of the same is increased, the bearing face for the spring and the point of attachment for the suspension means being provided on one and the same bracket in order that the bending stresses on the said bracket may be reduced to a minimum by a compensation of the spring reaction through the horizontal component set up by the load on the suspension means.

5. A device as claimed in claim 1 wherein a pair of links are provided which are connected by universal joints at either end thereof with the chassis and the brackets rigid with the same respectively; the said links forming a parallelogram adapted to suitably guide the rollers in their paths on their tracks and to keep the axle parallel to the transversal plane of the chassis in all the displacements of the axle with respect to the chassis.

In testimony whereof, I affix my signature.

LOUIS GRANGES.